(12) United States Patent
Jonqueres et al.

(10) Patent No.: US 9,580,180 B2
(45) Date of Patent: Feb. 28, 2017

(54) LOW-PRESSURE BLEED AIR AIRCRAFT ENVIRONMENTAL CONTROL SYSTEM

(71) Applicant: HONEYWELL INTERNATIONAL INC., Morristown, NJ (US)

(72) Inventors: Michel A. Jonqueres, Torrance, CA (US); Roy Araki, Redondo Beach, CA (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 86 days.

(21) Appl. No.: 14/200,263

(22) Filed: Mar. 7, 2014

(65) Prior Publication Data
US 2015/0251765 A1    Sep. 10, 2015

(51) Int. Cl.
*B64D 13/08*    (2006.01)
*B64D 13/06*    (2006.01)

(52) U.S. Cl.
CPC ............ *B64D 13/08* (2013.01); *B64D 13/06* (2013.01); *B64D 2013/0618* (2013.01); *B64D 2013/0674* (2013.01); *Y02T 50/56* (2013.01)

(58) Field of Classification Search
CPC  B64D 13/08; B64D 13/06; B64D 2013/0618; B64D 2013/0648; B64D 41/00
See application file for complete search history.

(56) References Cited

U.S. PATENT DOCUMENTS

| | | |
|---|---|---|
| 5,063,963 A | 11/1991 | Smith |
| 5,137,230 A | 8/1992 | Coffinberry |
| 5,299,763 A | 4/1994 | Bescoby et al. |
| 5,511,374 A | 4/1996 | Glickstein et al. |
| 5,704,218 A | 1/1998 | Christians et al. |
| 5,887,445 A | 3/1999 | Murry et al. |
| 5,967,461 A | 10/1999 | Farrington |
| 6,189,324 B1 * | 2/2001 | Williams ............... B64D 13/06 62/172 |
| 6,199,387 B1 | 3/2001 | Sauterleute |
| 6,257,003 B1 * | 7/2001 | Hipsky ................. B64D 13/06 62/402 |
| 6,427,471 B1 * | 8/2002 | Ando ..................... B64D 13/06 62/402 |
| 6,457,318 B1 * | 10/2002 | Lui ........................ B64D 13/06 62/402 |
| 6,526,775 B1 | 3/2003 | Asfia et al. |
| 6,550,253 B2 | 4/2003 | Mortzheim et al. |
| 6,615,574 B1 | 9/2003 | Marks |

(Continued)

FOREIGN PATENT DOCUMENTS

EP            891279 B1    1/1999

*Primary Examiner* — Emmanuel Duke
(74) *Attorney, Agent, or Firm* — Shimokaji IP

(57) ABSTRACT

An aircraft environmental control system (ECS) may be configured to operate in first mode and a second mode. The ECS may include an air cycle machine (ACM), a by-pass valve positioned to allow bleed air to by-pass the air cycle machine so that when the by-pass valve is open, the ECS operates in the first mode with bleed air at a first pressure and when the by-pass valve is closed the ECS operates in the second mode at a second bleed air pressure, higher than the first bleed air pressure. A bleed air system controller and ECS controller may be configured to selectively couple high pressure or low pressure bleed air ports of an engine of an aircraft to the ECS and control the by-pass valve position.

19 Claims, 3 Drawing Sheets

(56) References Cited

U.S. PATENT DOCUMENTS

| | | |
|---|---|---|
| 6,684,660 B1 | 2/2004 | Bruno et al. |
| 6,796,527 B1 | 9/2004 | Munoz et al. |
| 6,848,261 B2 | 2/2005 | Claeys |
| 6,871,510 B2 | 3/2005 | Haas |
| 6,908,062 B2 | 6/2005 | Munoz et al. |
| 6,942,183 B2 | 9/2005 | Zywiak |
| 7,000,425 B2 | 2/2006 | Army et al. |
| 7,143,573 B2 | 12/2006 | Hoffmann et al. |
| 7,334,422 B2 | 2/2008 | Zywiak |
| 7,334,423 B2 | 2/2008 | Bruno et al. |
| 7,467,524 B2 | 12/2008 | Brutscher et al. |
| 7,536,864 B2 | 5/2009 | Wolfe et al. |
| 7,607,318 B2 | 10/2009 | Lui et al. |
| 8,057,157 B2 | 11/2011 | Roush et al. |
| 8,240,153 B2 | 8/2012 | Childers et al. |
| 8,267,122 B2 | 9/2012 | Weber et al. |
| 8,302,407 B2 | 11/2012 | Alecu et al. |
| 2003/0051500 A1 | 3/2003 | Asfia et al. |
| 2004/0172963 A1* | 9/2004 | Axe .................. B64D 13/06 62/401 |
| 2006/0162371 A1* | 7/2006 | Lui .................. B64D 13/06 62/402 |
| 2007/0271952 A1* | 11/2007 | Lui .................. B64D 13/06 62/402 |
| 2008/0115503 A1 | 5/2008 | Vasquez et al. |
| 2009/0084896 A1 | 4/2009 | Boucher |
| 2009/0117840 A1 | 5/2009 | Kresser et al. |
| 2010/0323601 A1 | 12/2010 | Cremers et al. |
| 2011/0283713 A1* | 11/2011 | Kelnhofer ......... B64D 13/06 60/806 |
| 2012/0180509 A1* | 7/2012 | DeFrancesco ..... B64D 13/08 62/172 |
| 2012/0186267 A1 | 7/2012 | Coffinberry et al. |
| 2012/0192578 A1 | 8/2012 | Finney |
| 2013/0040545 A1 | 2/2013 | Finney |
| 2013/0133348 A1 | 5/2013 | Squier |
| 2013/0152615 A1* | 6/2013 | Lee .................. H05K 7/207 62/241 |
| 2013/0187007 A1 | 7/2013 | Mackin et al. |
| 2013/0192239 A1 | 8/2013 | Glahn et al. |

* cited by examiner

LOW-PRESSURE BLEED AIR AIRCRAFT ENVIRONMENTAL CONTROL SYSTEM

BACKGROUND OF THE INVENTION

The present invention generally relates to aircraft environmental control systems (ECS), propulsion engines and the bleed air systems that supply the ECS. More particularly, the invention relates to apparatus and methods by which an ECS may be operated with low pressure bleed air so that fuel burn is minimized during flight of an aircraft.

The new generation of commercial aircraft will have to be ever more fuel efficient. Some, maybe most, will remain powered by engines designed for supplying bleed air to the aircraft systems, but may have to offer fuel burn levels competitive with "more electric" bleed-less solutions. It is essential in order to reduce fuel usage by the airplane that the overall impact on the engine of various bleed and power extractions as well as drag requirements for both pressurizing and cooling the cabin be optimized. An energy optimized solution that may allow usage of lower bleed pressure supply from the engines to the ECS and other user systems would offer a competitive alternate to "more electric" ECS architectures with relatively low development risks.

As can be seen, there is a need for an ECS that may be operated with bleed air at lower pressure from a relatively lower energy stage from the engines and thereby providing for reduced fuel burn during flight of an aircraft.

SUMMARY OF THE INVENTION

Historically, aircraft engines and the aircraft systems that use engine power to operate have been specified, designed and procured separately and without the benefit of complete functional integration. Propulsion engine designs have generally preceded the aircraft systems due to the long lead time required to certify a new engine. For typical engines providing bleed air to the environmental control system (ECS), wing anti icing and other users, the bleed ports and their pressure levels have generally been set first based on engine design considerations and past experience about the requirements for these systems. No benefit could therefore accrue by designing an ECS capable of operation with lower bleed pressures. This invention intends instead to improve the aircraft fuel economy by coordinating the selection of the engine bleed ports with the design and operating modes of a type of ECS capable of performing with lower bleed pressure energy supplied by the engines.

In one aspect of the present invention, an aircraft environmental control system (ECS), is configured to operate in a first mode and a second mode. The ECS may comprise: an air cycle machine (ACM): a by-pass valve positioned to allow bleed air to by-pass the ACM so that when the by-pass valve is open, the ECS operates in the first mode with bleed air at a first pressure and when the by-pass valve is closed the ECS operates in the second mode at a second bleed air pressure, higher than the first bleed air pressure; and a bleed air system and ECS controller configured to selectively couple a high pressure bleed air port or a low pressure bleed air port of an engine of an aircraft to the ECS and control the by-pass valve position.

In another aspect of the present invention, an aircraft bleed-air power utilization system may comprise: an environmental control system (ECS) configured to selectively operate in a first mode at a first bleed air pressure and in second mode at a second bleed air pressure, the first bleed air pressure being lower than the second bleed air pressure; a cooling turbine configured to cool bleed air when the ECS operates in the second mode; an aircraft engine having a first bleed air port positioned to extract bleed air from the engine at the first bleed air pressure and a second bleed air port positioned to extract bleed air from the engine at the second bleed air pressure; and a by-pass valve positioned to eliminate pressure drop within the cooling turbine by directing bleed air from the first bleed air port around the cooling turbine and to stop the turbine when the ECS operates in the first mode.

In still another aspect of the present invention, a method for operating an aircraft bleed-air power utilization system may comprise the steps of: selectively coupling an environmental control system (ECS) to a first bleed air port or a second bleed air port of an engine of the aircraft, the first bleed air port providing bleed air at a first pressure and the second bleed air port providing bleed air at second pressure higher than the first pressure; directing bleed air from the second bleed air port to the ECS when the aircraft is in an idle mode of operation, directing bleed air from the first bleed air port to the ECS when the aircraft is in cruise, climb, hold or take off power; opening a by-pass valve to direct bleed air to by-pass an air-cycle machine (ACM) of the ECS at altitudes higher than about 25,000 feet; and closing the by-pass valve to direct bleed air through the air cycle machine turbine or turbines at altitudes lower than approximately 25,000 feet.

These and other features, aspects and advantages of the present invention will become better understood with reference to the following drawings, description and claims.

DETAILED DESCRIPTION OF THE INVENTION

Figure 1:
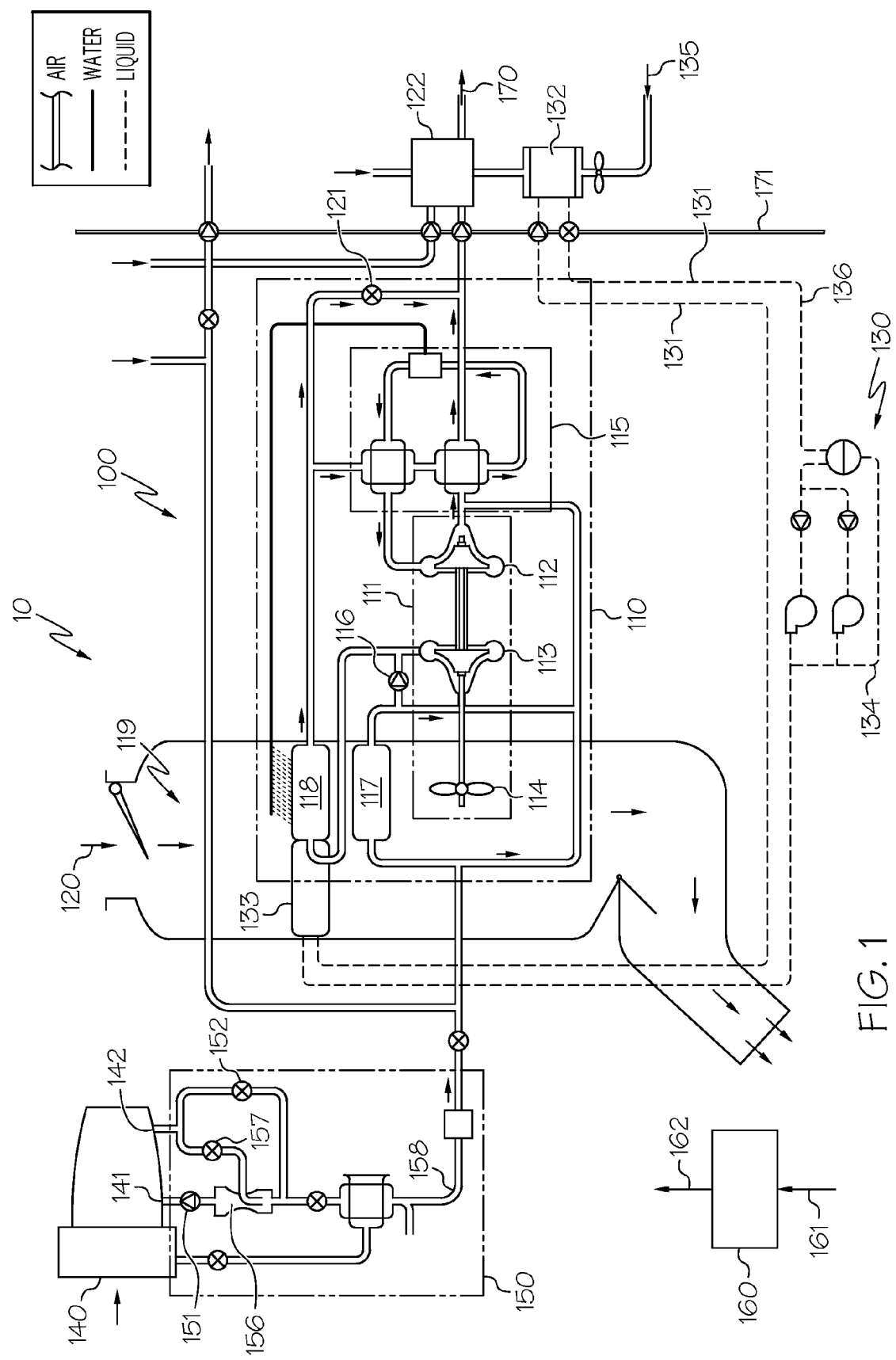
FIG. 1 is a schematic diagram of an aircraft bleed-air power utilization system in accordance with an exemplary embodiment of the invention.

The following detailed description is of the best currently contemplated modes of carrying out the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

The present invention generally provides a system by which an aircraft environmental control system (ECS) may be operated with low-pressure bleed air from one or more engines of the aircraft.

The system may consist of one or multiple ECS pack(s), including an air cycle machine (ACM) with at least one cooling turbine designed to expand processed bleed air to create a colder air supply to the aircraft cabin, at least one heat exchanger to cool the processed bleed air with outside "ram" air and a set of heat exchangers and water separators hereinafter referred to as "water management assembly", The system may be further equipped with a by-pass valve, hereinafter also referred to as an "altitude valve".

When the altitude valve is closed, most of the bleed air at relatively high pressure processed in the ECS pack flows through the cooling turbine, where its expansion causes the bleed air to be cooled to a level appropriate for air conditioning of the aircraft cabins. When the altitude valve is opened, most of the ECS pack bleed air flows directly from the heat exchangers to the aircraft cabin, by-passing the turbine and associated water handling equipment. As a result, the need to provide a high pressure to the ECS to allow for pressure reduction in the cooling turbine and the water handling equipment is eliminated, and only a relatively lower bleed pressure is required. This mode of operation of a "low bleed" ECS is hereinafter referred to as the "heat exchanger cooling" mode.

The engine and associated bleed air systems are simultaneously designed or modified to provide a set of two bleed ports, wherein the lower pressure bleed port is tapped from an engine compressor stage lower than for an aircraft equipped with a traditional ECS. That lower pressure port is designed to provide a bleed pressure compatible with the reduced requirements of the low bleed ECS.

Pack inlet pressure may be reduced from about 37 psia in cruise at 39,000 feet altitude to about 17 psia. At altitudes above approximately 25,000 feet outside air, generally colder than 20 degrees F., may be sufficient to cool the bleed air in the pack heat exchangers alone so that the pack supply airflow to the cabin can in turn cool the cabin loads and maintain a desired cabin temperature around 75 degrees F. In cruise at 39,000 feet, a bleed port according to the prior art may provide approximately 40 psia whereas a "Low Bleed" port according to this invention may provide approximately 22 psia. The difference in energy expanded by the engine to compress the bleed air represents an opportunity to reduce fuel burn.

A higher pressure bleed air port may be employed to satisfy the ECS and other bleed air requirements in all conditions when the engine is at reduced power, such as descent, hold and taxi modes. Just as the low bleed ECS has reduced pressure requirements at cruise altitudes, the invention allows this higher pressure bleed port to originate from a lower compressor stage than for a conventional system, thus also potentially contributing to a fuel burn reduction.

The low bleed ECS may include an additional subsystem to cool an amount of airflow taken from the aircraft cabin by heat transfer with ram air in an air-to-air heat exchanger located in ram ducting. The cooled cabin air may then be recirculated to the cabin where it may add a cooling capacity to supplement that provided by the ECS packs. That supplemental cooling circuit may be optionally turned on in particular when one ECS pack is inoperative at altitudes where the "heat exchanger cooling" mode of operation has been selected and the Low bleed engine port cannot supply sufficient pressure for the ECS to expand air in the cooling turbine for providing extra cooling capacity. A shut off valve may control passage of cabin air from the cabin to the heat exchanger across a pressure bulkhead and thus protect against failures that would cause a risk of aircraft depressurization.

The additional subsystem to cool an amount of airflow taken from the aircraft cabin may be performed indirectly by heat transfer with a liquid transport fluid, itself ultimately cooled by ram air. In that regard, the subsystem may include: a liquid to air heat exchanger in the ram ducting where the heat transfer fluid is cooled by ram air, a liquid to air heat exchanger located in the pressurized area of the aircraft, where a portion of the air from the cabin is cooled by the cooled liquid, and pumps, valves and ducting to move the heat transfer fluid between the two heat exchangers, control the liquid flow and cross the aircraft pressure bulkhead.

The bleed air system may include a jet pump and control valves. The jet pump may receive bleed air at high pressure from the higher bleed port and transfer some of its energy to bleed air from the lower port, the resulting mixed flow being at a higher pressure than the low bleed port. That feature may be optionally turned on to supplement the low bleed capability in conditions when a moderately higher pressure may be required by the ECS or other devices using bleed air. Such conditions may include, but are not restricted to: operation with wing anti icing, high altitude cruise and single ECS pack failures.

The engine and bleed system may include one or more additional intermediate bleed ports and associated control valves. In the case of a 3-port bleed system (including a single intermediate bleed port), the Intermediate bleed port may be chosen such as to provide sufficient bleed pressure for operation of the ECS in the turbine expansion mode at all cruise altitudes. The lower bleed port may then be selected from a lower pressure engine compressor stage such as to satisfy ECS operation in the "heat exchanger cooling" mode at a nominal cruising altitude. The higher stage may be selected in the same manner as described above.

Referring now to FIG. 1, an exemplary embodiment of an aircraft bleed-air power utilization system 10, which may include an aircraft ECS 100, is shown in schematic form. The ECS 100 may include a conventional air-cycle ECS pack 110 including a cooling turbine 112, compressor 113 and fan 114, a set of heat exchangers (reheater and condenser) and a water extractor, collectively referred to as water management assembly 115. ECS pack 110 may be selectively coupled to bleed air ports 141 and 142 of an engine 140 of an aircraft (not shown). The ECS 100 may also include a primary air-to-air heat exchanger 117 and a secondary air-to-air heat exchanger 118 positioned in a ram air duct 119 of the aircraft. A bleed air control system, designated generally by the numeral 150 may functionally interconnect components of the ECS 100 and the bleed air ports 141 and 142 and may control temperature and pressure of precooled bleed air supplied to the ECS pack 110.

An altitude or by-pass valve 121, positioned in ECS pack 110, may be opened to allow for bypassing of bleed air around the cooling turbine 112 and water management assembly 115. As the bleed air flow to the cooling turbine 112 is redirected toward valve 121, an air cycle machine 111 will stop. Pressure and temperature controlled bleed air flow may then flow through primary heat exchanger 117, check valve 116, secondary heat exchanger 118 and altitude valve 121 and directly to a mix manifold 122 and aircraft cabin 170. In this configuration, referred to as "heat exchanger cooling mode", the precooled bleed air may be cooled exclusively by ram air 120 in the two heat exchangers 118 and 117. Under these conditions, the ram air 120 may be cold enough to cool ECS pack supply air to a level where it would be able to maintain desired cabin interior temperature. As the cooling turbine 112 and water management assembly 115 may be no longer reducing the pressure of the precooled air, the pressure of bleed air supplied to the ECS pack 110 in that mode may be reduced at the source of the engine bleed ports. High pressure bleed air valve 152 may be closed and low pressure bleed air valve 151 may be opened. These valve positionings may result in bleed air being extracted only from the low pressure bleed air port 141.

Low pressure bleed port 141 location on the engine may be selected to closely match the pressure requirement of ECS 100 in the heat exchanger cooling mode. Thus the heat exchanger cooling mode may be effectively employed to reduce fuel burn when the aircraft is operating at high altitude, for example between about 25,000 to about 40,000 ft.

A liquid cooling loop, designated generally by the numeral 130, may be incorporated in the ECS 100. The liquid cooling loop 130 may include a cabin air heat exchanger 132 positioned in the pressurized fuselage of the aircraft and a liquid heat exchanger 133 positioned in the ram air duct 119. The cabin air heat exchanger 132 may extract heat from recirculating cabin air 135 and transfer that heat into a liquid medium 131 of the cooling loop 130. In an exemplary embodiment the cooling medium 131 may comprise polyethylene-glycol and water (PGW), PAO, Galden® or other suitable heat transfer fluid. The liquid medium 131 may convey the heat extracted from the cabin 170 to the liquid heat exchanger 133 so that the extracted heat may be transferred to ambient ram air 120 that may flow through the ram air duct 119. The liquid medium 131 may be driven by a pump system, designated generally by the numeral 134. The cooling medium 131 may be conveyed through tubing 136 which may have a relatively small diameter, e.g., about ½ inch to about ¾ inch. Consequently, the tubing 136 may pass through aircraft pressure bulkhead 171 within correspondingly small diameter openings.

Some flight conditions may arise in which re-starting of the ACM 111 may be desired even when the aircraft is in a cruise mode of operation. For example, the ECS 100 may be required to provide additional cooling in order to compensate for failure of one or more other ECS packs 110 on the aircraft. Additionally, at altitudes above 40,000 feet, the engines 140 may produce a reduced level of bleed pressure at the low pressure ports 141. Under these circumstances, it may be desirable to re-start the ACM 111. A secondary high pressure bleed air valve 157 may be opened to allow a limited amount of high pressure bleed air to flow out of the high pressure bleed air port 142 and into a jet pump 156. This action may allow the jet pump 156 to increase pressure of the low port and high port mixed flow to a level higher than bleed port 141 alone could provide and meet the needs of the ECS 100 or the other downstream demands, such as the wing deicing system. The by-pass valve 121 may then be closed and the cooling turbine 112 of the ACM 111 may begin operating.

Figure 2:
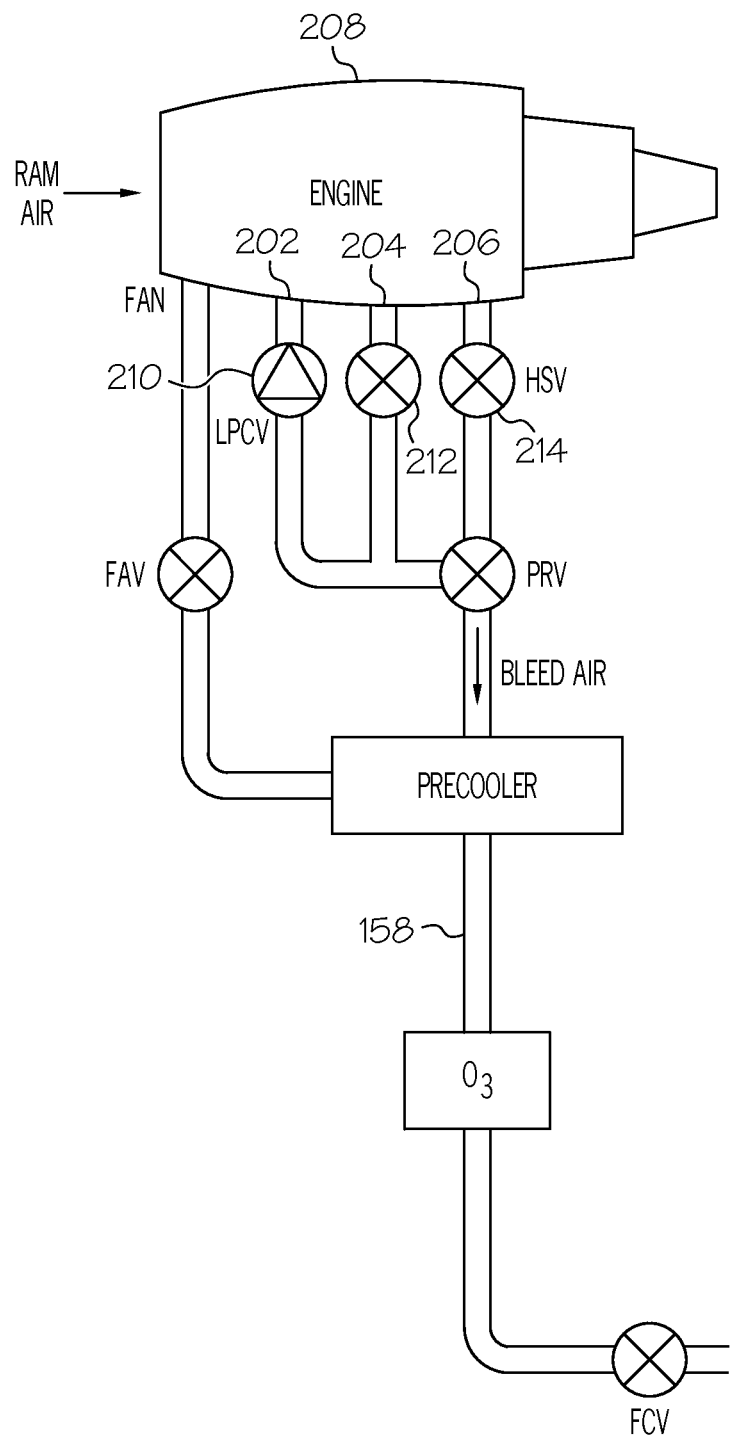
FIG. 2 is a schematic diagram of an aircraft engine and bleed air system in accordance with a second exemplary embodiment of the invention.

Referring now to FIG. 2, there is shown, in schematic form, an exemplary embodiment of an alternate engine bleed port arrangement that may be employed for operation of the ECS 100 of FIG. 1. An engine 208 may be provided with three bleed air ports, a low pressure bleed air port 202, an intermediate pressure bleed air port 204 and a high pressure bleed air port 206. The ports 202, 204 and 206 may be selectively coupled to the bleed air duct system 158 through bleed air valves 210, 212 and 214 respectively. In operation, the high pressure bleed air port 206 may supply bleed air during ground based operation, in-flight holding or during descent of the aircraft. At altitudes above 25,000 feet, the low pressure bleed air port 202 may be used to supply bleed air to the low bleed ECS 100 which may be operating in the heat exchanger cooling mode described above. The intermediate pressure bleed air port 204 may be selected only for some of the highest cruise altitudes, e.g., above 40,000 feet, and for ECS single pack failure mode operation where turbine expansion cooling is required to provide sufficient aircraft cooling capacity. The intermediate bleed port 204 may positioned so that when the ECS 100 is coupled to the intermediate bleed air port 204 the ECS 100 is operable at maximum flow at all aircraft altitudes in cruise with the by-pass valve 121 in the closed position.

Referring back to FIG. 1, it may be seen that a controller 160 may be incorporated into the ECS 100. The controller 160 may receive aircraft operational signals 161 and produce valve control commands 162 that may coordinate operation of the valves 151, 152, 157 and 121 of FIG. 1 and/or the valves 210, 212 and 214 in accordance with various aircraft operational modes.

For example, the controller 160 may command the high pressure bleed air valve 214 to couple the bleed air duct system 158 to the high pressure bleed air port 206 of the engine 208 during descent of the aircraft and command the low pressure bleed air valve 210 to couple the bleed air duct system 158 to the low pressure bleed air port 202 of the engine 208 during the take-off, climb and cruise phases of the aircraft flight. Additionally, the controller may command the intermediate pressure bleed air valve 212 to couple the bleed air duct system 158 to the intermediate pressure bleed air port 204 of the engine 208 during cruise of the aircraft at altitudes above about 40,000 feet or in cases where a higher pressure than the lower bleed port can provide is required.

Controller 160 may be set to optimize operation of the ECS 100 and bleed air system 150 so that the lowest pressure bleed port is selected, together with the ECS mode of operation, that satisfies the airflow, temperature and pressure demand of the aircraft cabin and other bleed air user systems, such as wing deicing, with the effect of minimizing engine fuel burn.

Figure 3:
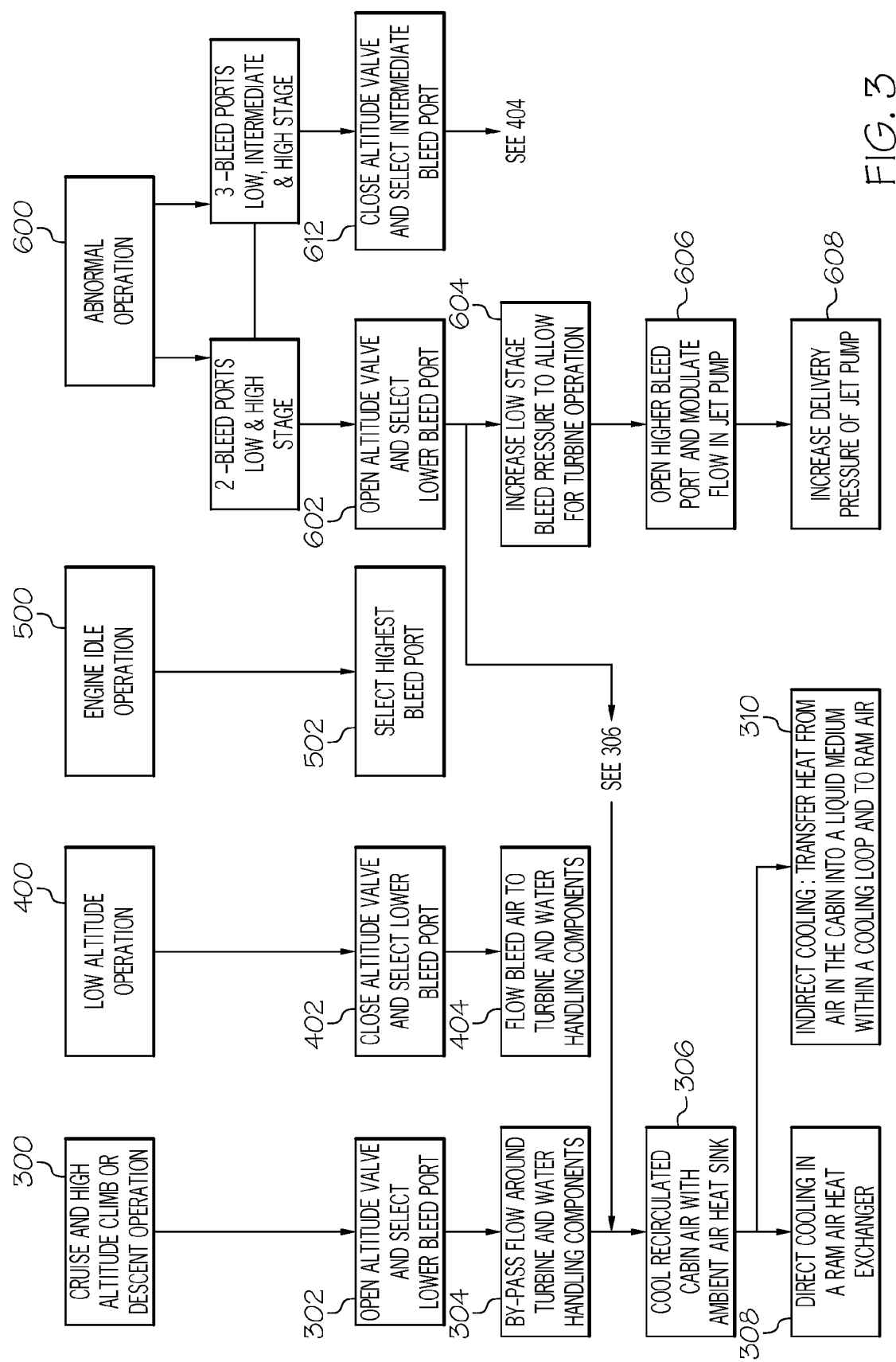
FIG. 3 is a flow chart of a method for controlling operation of an ECS in accordance with an exemplary embodiment of the invention.

Referring now to FIG. 3, flow chart 300, 400, 500 and 600 may illustrate a method for operating an aircraft engine and an environmental control system (ECS) relying on engine bleed air as an airflow and power source, together with the bleed air system.

Flow chart 300 may illustrate a method for operating the engine and ECS while the aircraft is in a cruise, or other high altitude mode of operation. In a step 302 an altitude valve may be opened and a low pressure bleed air port may be selected, (e.g., the by-pass valve 121 may be opened and the ECS 100 may be coupled to the bleed air port 141 of the engine 140). In a step 304, bleed air may by-pass a turbine and water handling components (e.g., Bleed air may by-pass the cooling turbine 112 and the water management assembly 115 and thereby experience a reduced pressure drop. Bleed air flow may then flow through primary heat exchanger 117, check valve 116, secondary heat exchanger 118 and altitude valve 121 and directly to a mix manifold 122 and aircraft cabin 170. The primary and secondary heat exchangers may be located within the ram air duct 119 and thus may be cooled by ram air 120). In a step 306, recirculated cabin air may be cooled with an ambient air heat sink, a process that may be performed directly in step 308. In an optional step 310, heat may be transferred indirectly from the cabin within a liquid cooling loop, (e.g., the cabin heat exchanger 132 may collect heat from recirculating cabin air. The liquid medium 131 may be conveyed to the ram air duct 119 of the aircraft. Heat may be transferred from the liquid medium 131 into ambient air 120 within the ram air duct 119 within the heat exchanger 133).

Flow chart 400 may illustrate a method for operating the engine and ECS while the aircraft is at relatively low altitude where outside air is not cold enough to cool the bleed air to satisfy the cabin cooling requirements. In a step 402, the by-pass altitude valve may be closed resulting in the bleed air flowing through one or more ECS turbines where its pressure reduction causes additional cooling. In this mode, the engine power setting may be such that the lower bleed port may typically provide sufficient pressure for operation of the ECS.

Flow chart 500 may illustrate a method for operating the engine and ECS while the engine is in an idle mode of operation. In a step 502, the highest bleed port may be selected, (e.g., the bleed port 142 may be connected to the bleed air system 150).

Flow chart 600 may illustrate a method for operating the engine and ECS under abnormal conditions, for example in the event of failure of one of the ECS packs or when the aircraft may be operating at an extremely high attitude at which engines produce relatively low bleed air pressure, or when higher than nominal pressure is required by any other system besides the ECS (e.g. wing anti-icing, air driven pumps).

Steps 602 through 608 may be performed within a two bleed-port engine configuration. In a step 602, the by-pass valve may be opened and the lower bleed air port may be selected. (e.g., the by-pass valve 121 may be opened and the bleed air port 141 may be selected). In a step 604, delivery pressure from the lower bleed air port may be increased by operating the jet pump, (e.g., the jet pump 156 may be operated). In a step 606, the higher bleed air port may be opened to modulate flow in the jet pump, (e.g., bleed air from the port 142 may be employed to modulate flow through the jet pump 156), resulting, in step 608 in a delivery pressure from the jet pump higher than the low stage bleed pressure. Alternatively, step 306 and 308 or 310 may be employed to increase the ECS cooling capacity.

Step 612 may be employed within a three bleed-port engine configuration. In this process, the by-pass valve may be closed and bleed air may be extracted from an intermediate bleed-air port (e.g., the by-pass valve 121 may be closed and bleed air may be extracted from the bleed air port 204) When the engine 208 is operated in a three port mode, the operable bleed air ports may be selected in accordance with; a). selecting the lowest pressure bleed port for normal operation, b). selecting an intermediate pressure bleed port when the aircraft experiences an ECS single pack failure, flight at 40,000 feet or higher or a cooling demand that cannot be satisfied with only ambient air cooling, or when other user systems pressure requirements exceed that of the lower bleed port, and c). selecting the highest bleed port for descent and conditions when the engine is operating at idle power.

It should be understood, of course, that the foregoing relates to exemplary embodiments of the invention and that modifications may be made without departing from the spirit and scope of the invention as set forth in the following claims.

We claim:

1. An aircraft environmental control system (ECS) configured to operate in a first mode and a second mode, the ECS comprising:
    an air cycle machine (ACM):
    a by-pass valve positioned to allow bleed air to by-pass the air cycle machine; so that when the by-pass valve is open, the ECS operates in the first mode with bleed air at a first pressure and when the by-pass valve is closed the ECS operates in the second mode at a second bleed air pressure, higher than the first bleed air pressure; and
    a bleed air system controller and ECS controller configured to selectively couple a high pressure bleed air port or a low pressure bleed air port of an engine of an aircraft to the ECS and control the by-pass valve position,
    wherein the bleed air is cooled by the ACM when the by-pass valve is closed,
    wherein the bleed air is not cooled by the ACM when the by-pass valve is open, and
    wherein the bleed air is cooled by a heat exchanger positioned in a ram air duct when the by-pass valve is open.

2. The system of claim 1 wherein the ECS controller is configured to:
    a) command opening of the by-pass valve when the aircraft is operating at altitudes above approximately 25,000 feet; and
    b) command closing of the by-pass valve when the aircraft is operating in ground taxi mode, climb, holding, or descent below an altitude of about 25,000 feet.

3. The system of claim 1 further comprising:
    a liquid cooling loop including;
        a liquid heat exchanger positioned in a ram air duct of the aircraft,
        a cabin air heat exchanger positioned in a pressurized area of the aircraft, and
        tubing interconnecting said heat exchangers, said tubing being configured to enable circulation of a liquid cooling medium through said heat exchangers,
    wherein a portion of air from a cabin is cooled in the cabin air heat exchanger by the liquid medium and recirculated to the cabin, and
    wherein the liquid medium is cooled in the liquid heat exchanger by ram air and recirculated to the cabin air heat exchanger.

4. An aircraft bleed-air power utilization system comprising: an environmental control system (ECS) configured to selectively operate in a first mode at a first bleed air pressure and in a second mode at a second bleed air pressure, the first bleed air pressure being lower than the second bleed air pressure; an air cycle machine (ACM) having a cooling turbine configured to cool bleed air when the ECS operates in the second mode; an aircraft engine having a first bleed air port positioned to extract bleed air from the engine at the first bleed air pressure and a second bleed air port positioned to extract bleed air from the engine at the second bleed air pressure; a by-pass valve positioned to eliminate pressure drop within the cooling turbine by directing bleed air from the first bleed air port, through a heat exchanger, around the cooling turbine and to stop the turbine when the ECS operates in the first mode, and a bleed air system controller and ECS controller configured to selectively couple the first bleed air port or the second bleed air port of the engine to the ECS and to control the by-pass valve, wherein the heat exchanger is positioned to transfer heat from bleed air to ram air.

5. The system of claim 4 further comprising:
    a water management assembly,
    wherein the by-pass valve is positioned to eliminate pressure drop within the water management assembly when the ECS operates in the first mode.

6. The system of claim 4 further comprising a bleed air system and an ECS controller configured to couple the first or second bleed air port to the ECS and control the by-pass valve position.

7. The system of claim 4 wherein the first bleed air port is positioned on the engine so that pressure of bleed air extracted from said first bleed air port matches bleed air requirements of the ECS when the by-pass valve is open.

8. The system of claim 4 wherein the second bleed air port is positioned on the engine so that pressure of bleed air extracted from said second bleed air port matches the bleed air requirements and operating modes of the ECS when the engine is operating at idle power.

9. The system of claim 4:
wherein the engine is provided with a third bleed air port; and
wherein the third bleed air port is positioned to extract bleed air at a pressure intermediate between the first and the second bleed air pressures.

10. The system of claim 9 wherein the third bleed air port is positioned so that when the ECS is coupled to the third bleed air port the ECS is operable at maximum flow at all aircraft altitudes in cruise with the by-pass valve in the closed position.

11. The system of claim 4:
wherein the ECS is selectively coupled with a high pressure bleed air port and a low pressure bleed air port of the engine; and
wherein a jet pump is selectively coupled with the high pressure bleed air port and the low pressure bleed air port of the engine.

12. A method for operating an aircraft bleed-air power utilization system comprising the steps of: operating a bleed air system controller and ECS controller to; selectively couple an environmental control system (ECS) to a first bleed air port or a second bleed air port of an engine of the aircraft, the first bleed air port providing bleed air at a first pressure and the second bleed air port providing bleed air at second pressure higher than the first pressure; direct bleed air from the second bleed air port to the ECS when the aircraft is in an idle mode of operation, direct bleed air from the first bleed air port to the ECS when the aircraft is in cruise, climb, hold or take off power, open a by-pass valve to direct bleed air to by-pass an air-cycle machine (ACM) of the ECS at altitudes higher than about 25,000 feet, and close the by-pass valve to direct bleed air through the air cycle machine turbine or turbines at altitudes lower than approximately 25,000 feet.

13. The method of claim 12 further comprising cooling bleed air through at least one heat exchanger positioned in a ram air duct of the aircraft.

14. The method of claim 12 further comprising cooling recirculated cabin air with an ambient air heat sink.

15. The method of claim 14 wherein the step of cooling recirculated cabin air includes transferring heat from the cabin into a liquid medium within a liquid cooling loop.

16. The method of claim 15:
wherein heat from the cabin is transferred to the liquid medium within a heat exchanger positioned within a pressurized fuselage of the aircraft; and
wherein cooling of the liquid medium is performed within a heat exchanger positioned in a ram air duct of the aircraft.

17. The method of claim 12 further comprising operating a jet pump between the first and second bleed ports to increase the first bleed port supply pressure.

18. The method of claim 12 further comprising coupling the ECS to a third bleed air port of the engine wherein the outlet pressure of bleed air at the third bleed air port is intermediate between outlet pressures of the first and second bleed air ports.

19. The method of claim 18 further comprising:
operating the engine bleed air system with at least three ports; and
selecting the engine bleed ports to be operated in accordance with:
  a). selecting the lowest pressure bleed port for normal operation
  b). selecting an intermediate pressure bleed port when the aircraft experiences an ECS single pack failure, flight at 40,000 feet or higher or a cooling demand that cannot be satisfied with only ambient air cooling, or when other user systems pressure requirements exceed that of the lower bleed port, and
  c). selecting the highest bleed port for descent and conditions when the engine is operating at idle power.

* * * * *